(12) United States Patent
Doddy et al.

(10) Patent No.: US 9,672,348 B2
(45) Date of Patent: *Jun. 6, 2017

(54) RISK-BASED CREDENTIAL MANAGEMENT

(71) Applicant: International Business Machines Corporation, Armonk, NY (US)

(72) Inventors: Leigh T. Doddy, Sunbury (AU); Christopher J. Hockings, Burleigh Waters (AU); Dinesh T. Jain, Pune (IN); Philip A. J. Nye, Southport (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,194

(22) Filed: May 27, 2015

(65) Prior Publication Data

US 2016/0226914 A1 Aug. 4, 2016

Related U.S. Application Data (63) Continuation of application No. 14/609,578, filed on Jan. 30, 2015.

(51) Int. Cl.
*H04L 29/06* (2006.01)
*G06F 21/45* (2013.01)

(52) U.S. Cl.
CPC .............. *G06F 21/45* (2013.01); *H04L 63/10* (2013.01); *H04L 63/102* (2013.01); *H04L 63/20* (2013.01)

(58) Field of Classification Search
CPC ....................................... G06F 21/45
USPC ......................................... 726/6
See application file for complete search history.

(56) References Cited

U.S. PATENT DOCUMENTS

| 8,402,546 B2* | 3/2013 | Greenshpon | G06F 21/577 706/52 |
| 9,106,646 B1* | 8/2015 | Zheng | H04L 63/0853 |
| 2014/0189812 A1 | 7/2014 | Ramstrom | |

OTHER PUBLICATIONS

Appendix P, List of IBM Patents or Patent Applications Treated As Related, pp. 1-2.
"IBM Security Privileged Identity Manager", published at least as early as Jan. 29, 2015, <http://www-03.ibm.com/software/products/en/pim/>.
"IBM Security Solutions for Endpoint Protection", published at least as early as Jan. 29, 2015, <http://www-01.ibm.com/software/tivoli/products/endpoint-faq/>.
"IBM Security Trusteer Apex Advanced Malware Protection", Copyright © 2014 IBM, <http://www-03.ibm.com/software/products/en/trusteer-apex-adv-malware>.
"Kaspersky Endpoint Security for Business Select", © 1997-2014 Kaspersky Lab, <http://www.kaspersky.com/business-security/endpoint-select>.

(Continued)

*Primary Examiner* — Longbit Chai
(74) *Attorney, Agent, or Firm* — Walter L. Rudberg; David M. Quinn; Christopher K. McLane (57) ABSTRACT

Risk-based credential management is provided. A request to checkout credentials is received. The credentials are associated with at least one managed resource. A risk value of the request is determined. The determination of the risk value is based, at least in part, on risk information of the requesting device. A determination is made whether to deny the request based, at least in part, on the risk value and a first predetermined threshold of a checkout policy.

8 Claims, 3 Drawing Sheets

(56) References Cited

OTHER PUBLICATIONS

"Privileged Identity and Asset Management", © 2003-2015 McAfee, Inc., <http://www.mcafee.com/us/microsites/sia-integrations/security-it-and-services/>, archived at <http://web.archive.org/web/20130926000136/http://www.mcafee.com/us/microsites/sia-integrations/security-it-and-services/>.
"Part 3: Privileged Identity Management Controls for the Hybrid Cloud", Mar. 19, 2013, <http://www.xceedium.com/blog/part-3-privileged-identity-management-controls-for-the-hybrid-cloud>.
"Privilege Identity Management", Copyright © 2014 ARCON, <http://arconnet.com/products/privilege-identity-manager>.
"Privileged Session Manager", Copyright © 2014 CyberArk Software, Ltd, <http://www.cyberark.com/resource_product/privileged-session-manager/>.
"Symantec Endpoint Protection", © 1995-2014 Symantec Corporation, <http://www.symantec.com/en/in/endpoint-protection>.
"System Center 2012 R2 Configuration Manager", © 2014 Microsoft, <http://www.microsoft.com/en-us/server-cloud/products/system-center-2012-r2-configuration-manager/#fbid=nK9J71kY2xa>.
"Use of Endpoint Anti-virus Health Status in DLP Policies", IP.com No. 000201329, IP.com Electronic Publication: Nov. 11, 2010, Copyright © 2010 Symantec Corporation.
"Risk-Based Credential Management", U.S. Appl. No. 14/609,578, pp. 1-26, filed Jan. 30, 2015.

\* cited by examiner

RISK-BASED CREDENTIAL MANAGEMENT

BACKGROUND OF THE INVENTION

The present invention relates generally to the field of information security and more particularly to risk-based credential management.

Identity management is a field relating to the management of individual principals (e.g., users) and their authentication, authorization and privileges within or across system and enterprise boundaries. The goal of identity management is increasing security and productivity while decreasing cost, downtime, and repetitive tasks.

Some individuals have access to accounts that hold elevated permission to access IT resources in an organization. These accounts are called privileged identities and are used in a wide variety of environments, including server and desktop operating systems, business applications, databases, web services, and network appliances.

Trusted insiders (such as IT administrators) have access to such privileged identities for managing important resources and sensitive information entrusted to their care. Privileged Identity Management (PIM) solutions help organizations manage, monitor, and protect such privileged identities and reduce internal data breaches within IT environments.

SUMMARY

According to one embodiment of the present disclosure, a method for credential management is provided. The method includes receiving, from a requesting device, a request to checkout credentials, wherein the credentials are associated with at least one managed resource; determining a risk value of the request, wherein the determination of the risk value is based, at least in part, on risk information of the requesting device; and determining whether to deny the request based, at least in part, on the risk value and a first predetermined threshold of a checkout policy.

According to another embodiment of the present disclosure, a computer program product for credential management is provided. The computer program product comprises a computer readable storage medium and program instructions stored on the computer readable storage medium. The program instructions include program instructions to receive, from a requesting device, a request to checkout credentials, wherein the credentials are associated with at least one managed resource; program instructions to determine a risk value of the request, wherein the determination of the risk value is based, at least in part, on risk information of the requesting device; and program instructions to determine whether to deny the request based, at least in part, on the risk value and a first predetermined threshold of a checkout policy.

According to another embodiment of the present disclosure, a computer system for credential management is provided. The computer system includes one or more computer processors, one or more computer readable storage media, and program instructions stored on the computer readable storage media for execution by at least one of the one or more processors. The program instructions include program instructions to receive, from a requesting device, a request to checkout credentials, wherein the credentials are associated with at least one managed resource; program instructions to determine a risk value of the request, wherein the determination of the risk value is based, at least in part, on risk information of the requesting device; and program instructions to determine whether to deny the request based, at least in part, on the risk value and a first predetermined threshold of a checkout policy.

DETAILED DESCRIPTION

Embodiments of the present invention recognize that organizations employ malware protection programs to reduce the possibility of malware infecting user devices within their networks, or, when such a device is infected, minimize the loss and/or corruption of critical data. Organizations may employ identity management (IdM) solutions to control access to various computing resources by users. However, current IdM solutions do not provide risk-based decision-making when allowing IT administrators to access privileged accounts, nor do they control access from malware-infected user devices to privileged identities.

Embodiments of the present invention provide risk-based decision-making for requests to checkout credentials, such as privileged credentials authorized to access managed resources. Embodiments provide access controls for credentials based on a risk-based credential checkout policy.

The flowchart and block diagrams in the Figures illustrate the architecture, functionality, and operation of possible implementations of systems, methods, and computer program products according to various embodiments of the present invention. In some alternative implementations, the functions noted in the block may occur out of the order noted in the figures. For example, two blocks shown in succession may, in fact, be executed substantially concurrently, or the blocks may sometimes be executed in the reverse order.

The present disclosure will now be described in detail with reference to the Figures.

Figure 1:
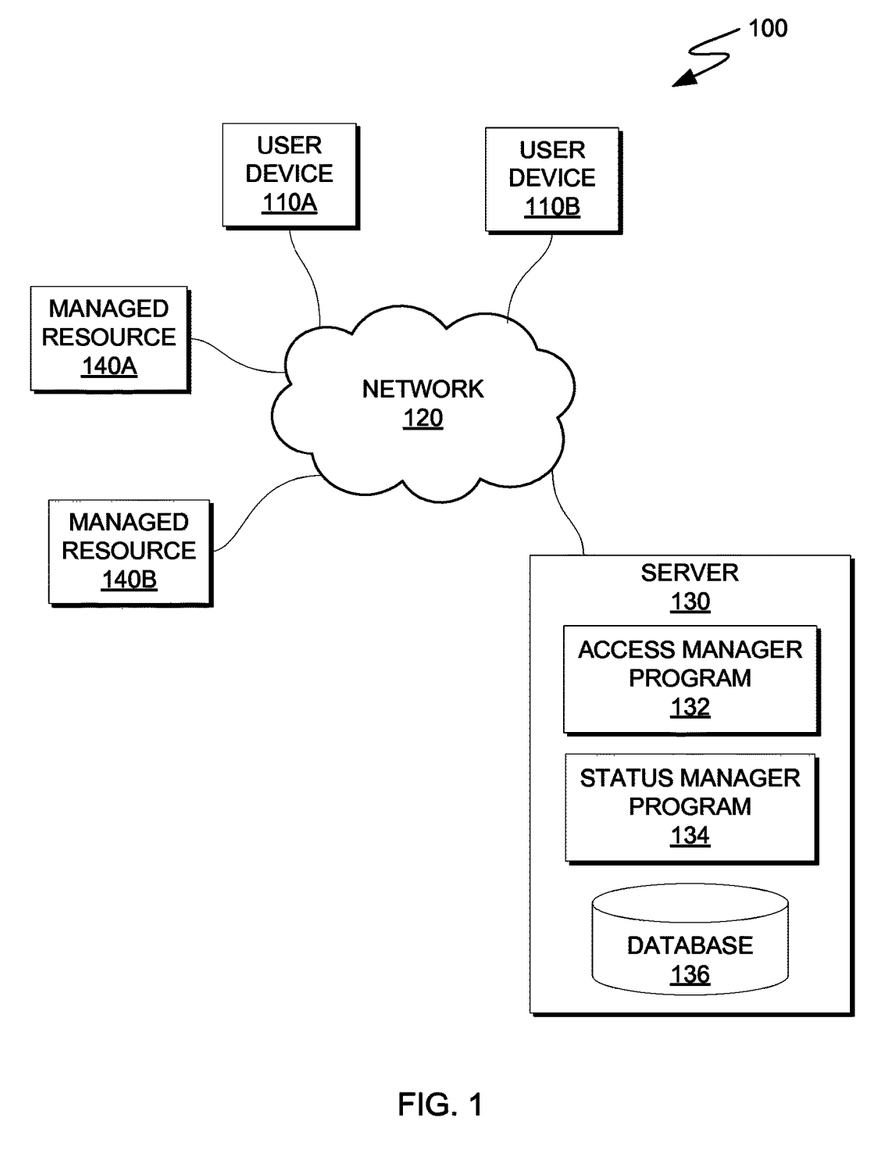
FIG. 1 is a functional block diagram illustrating a computing environment executing operations for risk-based credential management, in accordance with an embodiment of the present disclosure.

FIG. 1 is a functional block diagram illustrating a computing environment, in accordance with an embodiment of the present disclosure. For example, FIG. 1 is a functional block diagram illustrating computing environment 100. Computing environment 100 includes user device 110A, user device 110B, sever 130, managed resource 140A, and managed resource 140B, connected over network 120. Each of managed resource 140A and managed resource 140B is an example of managed resource 140. Managed resource 140 is not necessarily identical to another managed resource 140. Server 130 includes access manager program 132, status manager program 134, and database 136.

Each of user device 110A and user device 110B is an example of a user device 110. A user device 110 is not necessarily identical to another user device 110. In various embodiments, a user device 110 is a computing device that can be a standalone device, a server, a laptop computer, a tablet computer, a netbook computer, a personal computer (PC), or a desktop computer. In another embodiment, a user device 110 represents a computing system utilizing clustered computers and components to act as a single pool of seamless resources. In general, a user device 110 can be any computing device or a combination of devices with access to managed resource 140 and server 130 over network 120. User device 110 may include internal and external hardware components, as depicted and described in further detail with respect to FIG. 3.

In this exemplary embodiment, access manager program 132 and status manager program 134 are stored on server 130. In other embodiments, one or both of access manager program 132 and status manager program 134 may reside on another computing device, provided that each can access and is accessible by each other, and provided that each can access database 136 and provided that each is accessible by user device 110. In yet other embodiments, one or both of access manager program 132 and status manager program 134 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110, server 130, and managed resource 140, in accordance with a desired embodiment of the present invention.

Access manager program 132 operates to manage credential checkout requests for various operations. In one embodiment, access manager program 132 intercepts a credential checkout request. For example, access manager program 132 intercepts a request from user device 110A to checkout a set of credentials. In one embodiment, access manager program 132 intercepts a request for another type of operation, in which case access manager program 132 performs operations 200 (See FIG. 2) for the intercepted operation. For example, access manager program 132 intercepts a request to change a password. In one embodiment, access manager program 132 determines a risk level associated with the user device from which the request came. For example, access manager program 132 determines a risk level based on a security status of malware-infected user device 110A. In one embodiment, access manager program 132 determines a risk level based on the managed resource 140 for which the checkout request applies. For example, access manager program 132 determines the risk level associated with granting a request to checkout credentials to a non-authorized external application such as a social media forum. In one embodiment, access manager program 132 grants or denies the checkout request. For example, access manager program 132 grants the intercepted request based on the determined risk level and a predetermined threshold.

Status manager program 134 operates to obtain, monitor, and report ongoing status information within environment 100. This status information may be used, in various examples, for audit and compliance needs, to enable access manager program 132 to create better risk-based decisions regarding credential checkout operations, and to help minimize the effects of security threats within the computing system.

In one embodiment, status manager program 134 obtains security status information about a user device. For example, status manager program 134 obtains the security status indicating user device 110A is infected with malware. In another embodiment, status manager program 134 monitors connections within the environment. For example, status manager program 134 identifies that user device 110A is connected to managed resource 140B through network 120. In another embodiment, status manager program 134 identifies which account credentials that various computing devices are currently using. For example, status manager program 134 identifies that user device 110B is currently using privileged account credentials for access to managed resource 140B through network 120. In another embodiment, status manager program 134 obtains information about the security level of managed resource 140 within environment 100. For example, status manager program 134 obtains data indicating managed resource 140A has a low IP reputation which may threaten the IT security of any user device 110 connected to it. In another embodiment, status manager program 134 generates reports that indicate which credentials are checked out. For example, status manager program 134 generates a report that indicates a privileged identity credential is checked out for managed resource 140A. In another embodiment, status manager program 134 generates a status report for user devices within environment 100. For example, status manager program 134 generates a report indicating user device 110A contains malware. In another embodiment, status manager program 134 stores status report information. For example, status manager program 134 stores a malware status report to database 136, over network 120. In this case, the malware status report may indicate user device 110A is infected with malware. In another embodiment, status manager 134 may adjust the risk-based security policy to take into account new conditions which pose potential threats to IT security.

Database 136 is a data repository that may be written to and read by one or both of access manager program 132 and status manager program 134. In one embodiment, database 136 stores a credential checkout status report that identifies a checkout status for each of one or more credentials. For example, responsive to a credential checkout request, access manager program 132 accesses the credential checkout status report on database 136, and determines that the credentials being requested are already checked out based on the checkout status of the requested credentials. In response, access manager program 132 denies the checkout request. Information utilized by software operating on server 130 may be stored in database 136. In one embodiment, database 136 stores source and destination service information. For example, database 136 stores IP address information of managed resource 140B so that access manager program 132 is able to enforce policies based on IP reputation changes of managed resource 140B. In some embodiments, database 136 may be written to and read by programs and entities outside of computing environment 100 in order to populate the repository with information relevant to the system operation, for example audit and compliance data.

Figure 2:
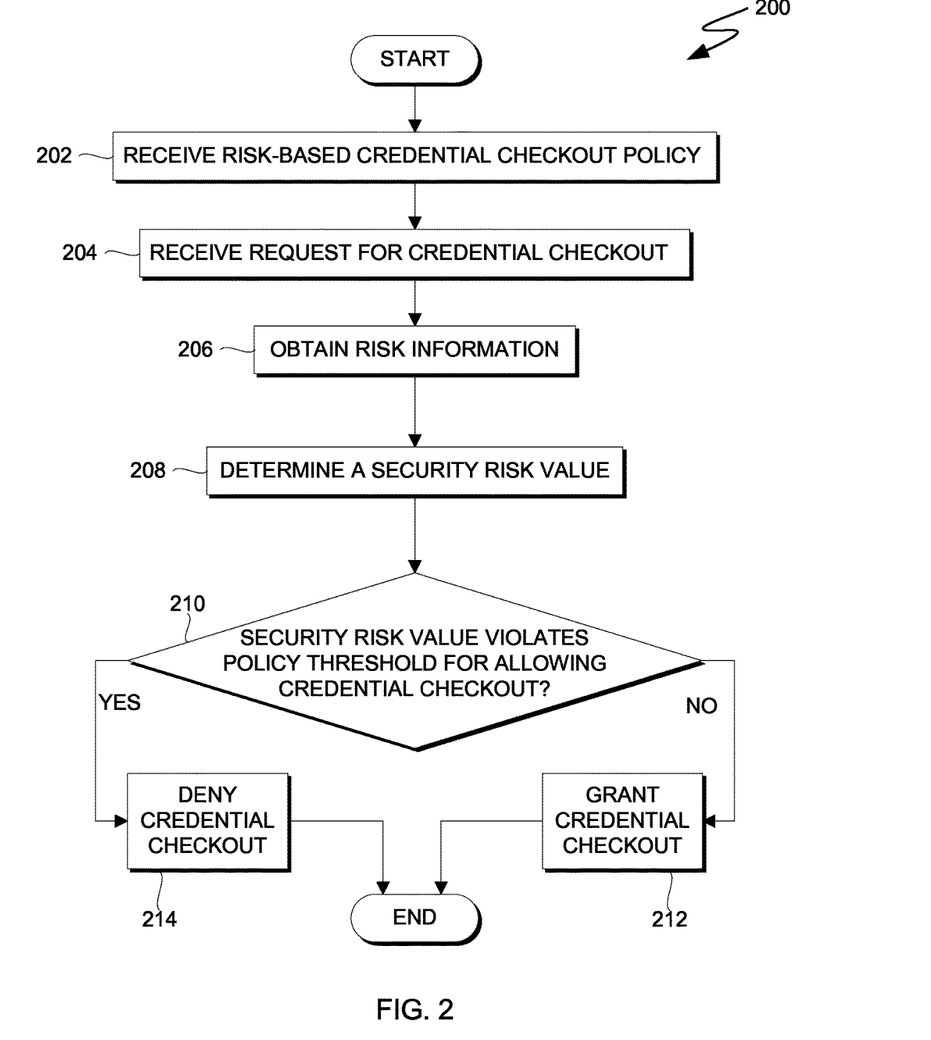
FIG. 2 is a flowchart depicting operations for risk-based credential management within the computing environment of FIG. 1, in accordance with an embodiment of the present disclosure.

FIG. 2 is a flowchart depicting operations for risk-based credential management within the computing environment of FIG. 1, in accordance with an embodiment of the present disclosure. For example, FIG. 2 is a flowchart depicting operations 200 of access manager program 132 on server 130 within computing environment 100.

In step 202, access manager program 132 receives the risk-based credential checkout policy. In one embodiment, the policy describes the conditions under which credential checkout requests are granted or denied. In various embodiments, the policy is predefined, provided via user input, received from a computing device within environment 100, algorithmically-determined, or any combination thereof.

In one embodiment, the policy identifies one or more managed resources. For example, the policy may identify managed resource 140A and managed resource 140B. In another embodiment, the policy identifies one or more user-roles associated with the policy. For example, the received policy may identify a first user-role corresponding to a first set of credentials with administrative privileges for a first set of managed resources and a second set of credentials with administrative privileges for a second set of managed resources. In another embodiment, one or both of a user-role and a set of credentials may be associated with a managed resource 140. For example, the policy may specify managed resources that a set of credentials is authorized to access. In another example, a user-role may identify one or more sets of credentials having administrative privileges for managed resource 140A.

In another embodiment, the policy defines one or more criteria which access manager program 132 uses to determine whether to allow a credential checkout request received from user device 110. In one embodiment, the policy dictates that checkout requests be granted only to user devices free of malware. For example, a checkout request received from user device 110A is denied in response to access manager program 132 determining that user device 110A is infected with malware. In another embodiment, the policy defines (via one or more criteria) a threshold of malware infection that is acceptable for allowing a checkout request. For example, the policy may define a threshold by classifying certain types of malware (e.g., HTTP cookies) as acceptable and other types of malware (e.g., computer viruses, computer worms) as being unacceptably unsafe.

In some embodiments, the policy defines one or more actions to be performed in response to access manager program 132 determining whether the criteria of the policy are met. In one embodiment, the actions include raising a compliance alert responsive to determining that a user device 110 from which a checkout request is received is infected with malware. For example, access manager program 132 generates a compliance alert in response to determining that user device 110A, from which access manager program 132 received a checkout request, is infected with malware. In this example, the compliance alert may indicate the malware status of user device 110A (e.g., that user device 110A is infected, the malware detected, or a combination thereof). In another embodiment, the actions defined by the policy include denying a checkout request. For example, access manager program 132 denies a checkout request from user device 110A responsive to determining that the level of malware present on user device 110A violates the allowable threshold level defined by policy. In yet another embodiment, the actions defined by the policy include removing a user from a user-role. For example, responsive to denying a checkout request, access manager program 132 removes a user from a user-role (such as a privileged identity role). In another embodiment, the policy defines the approval workflow to follow prior to permitting a credential checkout operation from a malware-infected user device 110. For example, responsive to receiving a checkout request from malware-infected user device 110B, for credentials associated with managed resource 140A, the policy allows access manager program 132 to grant the request, provided approval is received from an administrator of managed resource 140A.

In step 204, access manager program 132 receives a request for a credential checkout. In one embodiment, access manager program 132 receives a checkout request from a user device for credentials having authorization to access managed resource 140. For example, access manager program 132 receives a request from a user operating on user device 110A to checkout privileged credentials that will allow the user to perform administrative operations on managed resource 140B.

In step 206, access manager program 132 obtains risk information. In one embodiment, access manager program 132 obtains risk information for user device 110. Based on the risk-based credential policy, access manager program 132 determines what data to use in making risk-based credential checkout decisions and obtains the data. In various examples, the risk information includes information such as whether the user device is infected with malware (i.e., whether any data on the user device matches a malware definition), what program(s) (and versions thereof) are installed, what security patches (e.g., software patches or updates) are installed, the encryption status of any network connections to which the user device is connected, historical information (e.g., activity logs or access logs) that identifies any occurrences of user device 110 accessing potentially compromised network resources, or a combination thereof. In one embodiment, the risk-based credential policy specifies one or more types of risk information for access manager program 132 to obtain. In other embodiments, the risk information includes information such as, for example, security audit information, compliance report information, separation of duties (SOD) definitions, malware status of user device 110, IP reputation scores of managed resource 140, availability of requested credentials for checkout, status of connections between user device 110 and managed resource 140, or a combination thereof. For example, access manager program 132 obtains information indicating that user device 110A is connected to managed resource 140B, which has a low IP reputation score.

In another embodiment, access manager program 132 obtains a report identifying users that access privileged account information. For example, access manager program 132 obtains a report which indicated user device 110B accesses privileged information on managed resource 140A. In one embodiment, access manager program 132 obtains risk information by directly evaluating (e.g., inspecting, scanning, or auditing) the user device from which access manager program 132 received a checkout request. In one embodiment, access manager program 132 determines whether a previously granted operation request was performed as intended. For example, access manager program 132 verifies that a checkout operation was performed as intended. For example, access manager program 132 verifies that user device 110A accessed managed resource 140B, as requested and granted in the checkout operation. In a further example, access manager program 132 identifies that a checkout operation was not performed as intended. For example, responsive to granting a request for user device 110B to access managed resource 140A, access manager program 132 determines that user device 110A accessed managed resource 140B.

In one embodiment, access manager program 132 determines whether a previously granted operation was performed within the allowable time parameters. For example, based on information stored in database 136, access manager program 132 determines that a lease arrangement allowing connections to managed database 140B has expired and therefore denies a request from user device 110A to access managed database 140B. In another embodiment, access manager program 132 receives one or more types of risk information utilizing security software such as, for example, an anti-malware program, virus scanner, vulnerability detector, deep packet inspector, or intrusion detector.

In step 208, access manager program 132 determines a security risk value. In one embodiment, access manager program 132 determines a security risk value for user device 110 from which access manager program 132 received a credential checkout request. In this case, access manager program 132 determines the security risk value based on one or more types of risk information for user device 110. The security risk value is a measure of the risk of granting the credential checkout request. The risk is a risk of compromising data security. For example, the security risk value may be based on the risk that user device 110 is compromised, in which case a high security risk value indicates that the user device is insecure. In other examples, the security risk value may be based on other characteristics of the checkout request, including any type of risk information that access manager program 132 can obtain. In further examples, the security risk value may be based on the perceived value of information being protected by a managed resource. For example, a high risk value may be assigned to a request from user device 110A to access managed resource 140A, where managed resource 140A contains links and information regarding top secret governmental projects. In one embodiment, access manager program 132 determines a security risk value based on whether allowing the credential checkout would cause an SOD conflict. For example, responsive to receiving the checkout request, access manager program 132 identifies credentials checked out by user device 110A, reviews SOD conflict definitions, determines that granting the request would result in user device 110A being in violation of SOD rules, and assigns a high security risk value to the request.

In another embodiment of step 208, access manager program 132 determines that allowing user device 110 to checkout credentials would pose a security risk. For example, access manager program 132 identifies that user device 110A is connected to network 120 via an unencrypted wireless connection, determines that granting the request may compromise the IT security of devices within environment 100, and assigns a high security risk value to the request.

In yet another embodiment of step 208, access manager program 132 analyzes activity data of user device 110 and determines the security risk value. For example, access manager program 132 analyzes network activity data of user device 110A to identify anomalies (e.g., anomalous volumes of network traffic, repeated failed login attempts); computing activity of user device 110A to identify anomalies (e.g., anomalies in the operating system computing stack of user device 110A); or a combination thereof. Based upon network activity analysis, access manager program 132 identifies repeated failed login attempts by user device 110A, and, in response, assigns a high security risk value to the checkout request.

In decision 210, access manager program 132 determines whether the security risk value violates a threshold specified by the risk-based credential checkout policy. In one embodiment, access manager program 132 compares the security risk value (determined in step 208) to the requirements (e.g., the threshold) specified by the risk-based credential checkout policy (determined in step 202). If access manager program 132 determines that the risk value does not violate the specified threshold (decision 210, NO branch), then access manager program 132 grants the credential checkout request (step 212). If access manager program 132 determines that the security risk value violates the specified threshold (decision 210, YES branch), then access manager program 132 denies the credential checkout (step 214).

Figure 3:
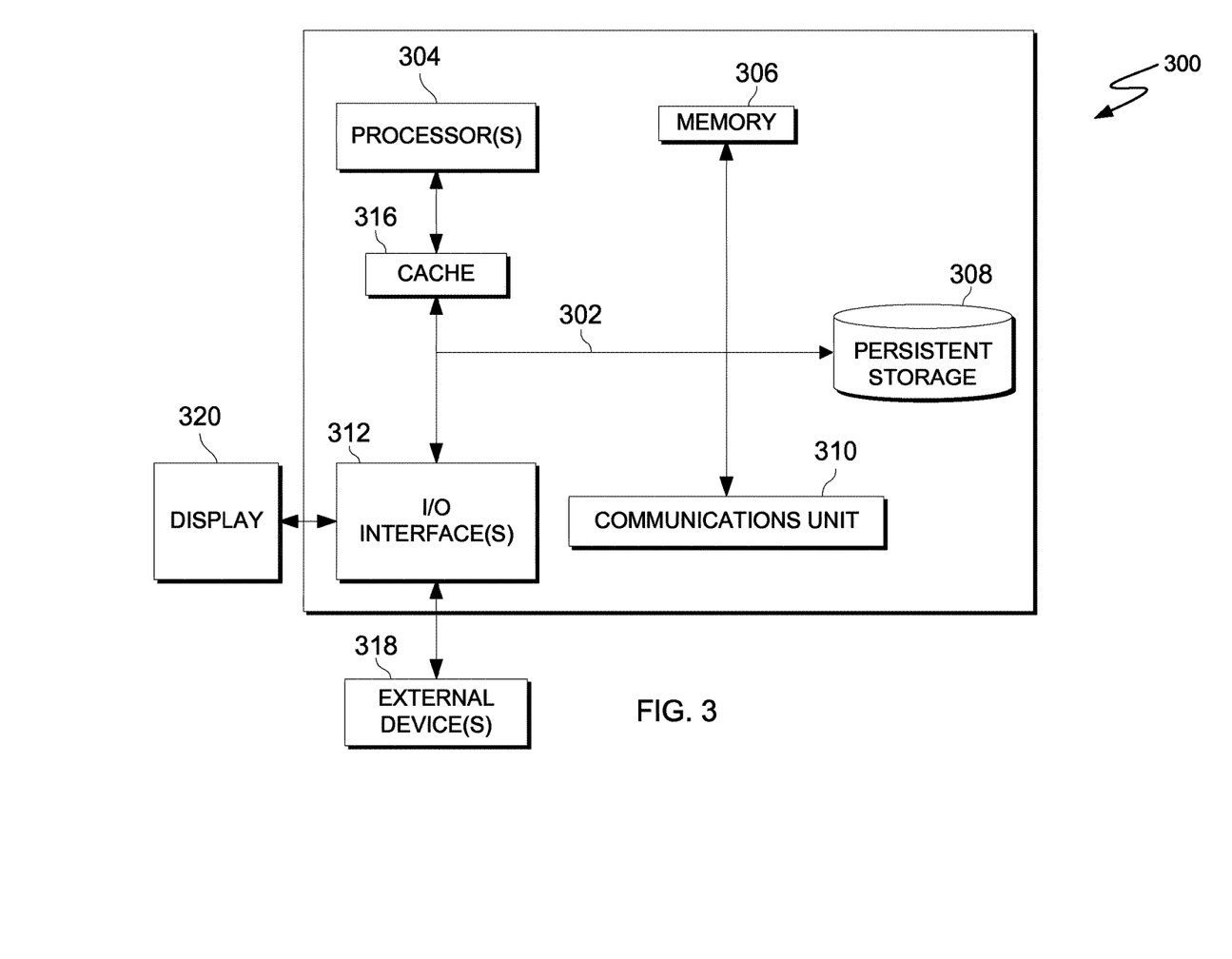
FIG. 3 is a block diagram of components of a computing device executing operations for risk-based credential management, in accordance with an embodiment of the present disclosure.

FIG. 3 is a block diagram of components of a user device, generally designated 300, in accordance with an embodiment of the present disclosure. In one embodiment, user device 300 is representative of user device 110. For example, FIG. 3 is a block diagram of user device 110 within computing environment 100 executing operations of checking out credentials to gain access and perform operations on managed resource 140.

It should be appreciated that FIG. 3 provides only an illustration of one implementation and does not imply any limitations with regard to the environments in which different embodiments may be implemented. Many modifications to the depicted environment may be made.

FIG. 3 depicts computer system 300, which is an example of a system that includes server 130. Processors 304 and cache 316 are substantially equivalent to multi-core user device 110. Computer system 300 includes processors 304, cache 316, memory 306, persistent storage 308, communications unit 310, input/output (I/O) interface(s) 312 and communications fabric 302. Communications fabric 302 provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data and data near accessed data from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to each computer system. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also may connect to a display 320.

Display 320 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for credential management, the method comprising:
  receiving, by one or more hardware processors, from a requesting device, a request to checkout credentials; wherein the credentials are associated with at least one managed resource;
  determining, by one or more hardware processors, a risk value of the request, wherein the determination of the risk value is based, at least in part, on risk information of the requesting device; and
  determining, by one or more hardware processors, whether to deny the request based, at least in part, on the risk value and a first predetermined threshold of a checkout policy by classifying certain types of malware of the requesting device.

2. The method of claim 1, wherein determining whether to deny the request comprises:
  determining, by one or more processors, that the risk value violates the first predetermined threshold and, in response, denying the request.

3. The method of claim 2, wherein determining, by one or more processors, whether to deny the request is further based on a security status of each of the at least one managed resources.

4. The method of claim 3, further comprising:
  responsive to determining that the security status indicates that a first managed resource of the at least one managed resource is compromised, denying, by one or more processors, the request.

5. The method of claim 1, wherein determining whether to deny the request comprises:
  determining, by one or more processors, that the risk value does not violate the first predetermined threshold and, in response, granting the request.

6. The method of claim 1, wherein the credentials authorize access to the at least one managed resource associated with the credentials.

7. The method of claim 1, wherein the risk value is based, at least in part, on one or more types of risk information that are specified by the checkout policy.

8. The method of claim 7, wherein the one or more types of risk information identify at least one of: data of the requesting device that matches a malware definition, a version of each of a plurality of programs installed on the requesting device, and a security patch installed on the requesting device.

* * * * *